United States Patent
Kund

[11] Patent Number: 5,178,033
[45] Date of Patent: Jan. 12, 1993

[54] BICYCLE GEAR DISPLAY

[76] Inventor: August Kund, 2238 Calaveras Dr., Camarillo, Calif. 93010

[21] Appl. No.: 753,971

[22] Filed: Sep. 3, 1991

[51] Int. Cl.[5] ................................................. F16C 1/10
[52] U.S. Cl. .............................. 74/501.5 R; 74/502.2; 74/489; 74/422; 74/DIG. 7; 116/28.1; 116/317; 280/288.4
[58] Field of Search ............... 74/501.5 R, 502.2, 488, 74/489, 502, 503, DIG. 7, 89.17, 422; 116/28.1, 300, 317, DIG. 20; 280/288.4

[56] References Cited

U.S. PATENT DOCUMENTS

| | | | |
|---|---|---|---|
| 1,645,464 | 10/1927 | Tredway | 74/DIG. 7 X |
| 2,905,017 | 9/1959 | Randolph | 74/489 |
| 3,406,587 | 10/1968 | Brilando et al. | 116/28.1 X |
| 3,524,979 | 8/1970 | Cohen | 74/489 X |
| 3,554,156 | 1/1971 | Kishida | 74/489 X |
| 3,554,158 | 1/1971 | Shimano | 74/489 X |
| 3,856,123 | 12/1974 | Kinsey | 74/DIG. 7 X |
| 4,586,396 | 5/1986 | Nagano | 74/489 X |
| 4,924,723 | 5/1990 | Cristie | 74/489 X |
| 5,052,241 | 10/1991 | Nagano | 74/489 X |

Primary Examiner—Richard Lorence
Assistant Examiner—Andrea Pitts
Attorney, Agent, or Firm—Blakely, Sokoloff, Taylor & Zafman

[57] ABSTRACT

A display device for use on a multi-speed (multi-gear) bicycle, which indicates the currently selected bicycle gear. The device interfaces directly with a gear changing cable. In one embodiment, a toothed rack is attached to a section of cable running along the bicycle frame. A pinion, attached to a cylindrical indicator meshes with the rack. In an embodiment for remote mounting, a slave cable is attached to the gear changing cable to transmit the motion of the gear changing cable to the remote location.

20 Claims, 6 Drawing Sheets

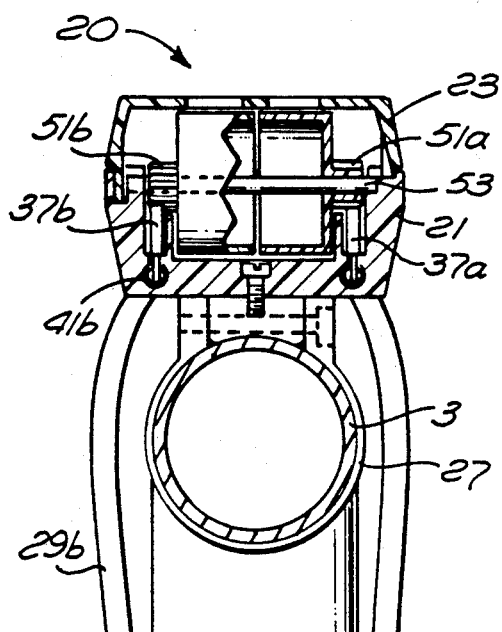
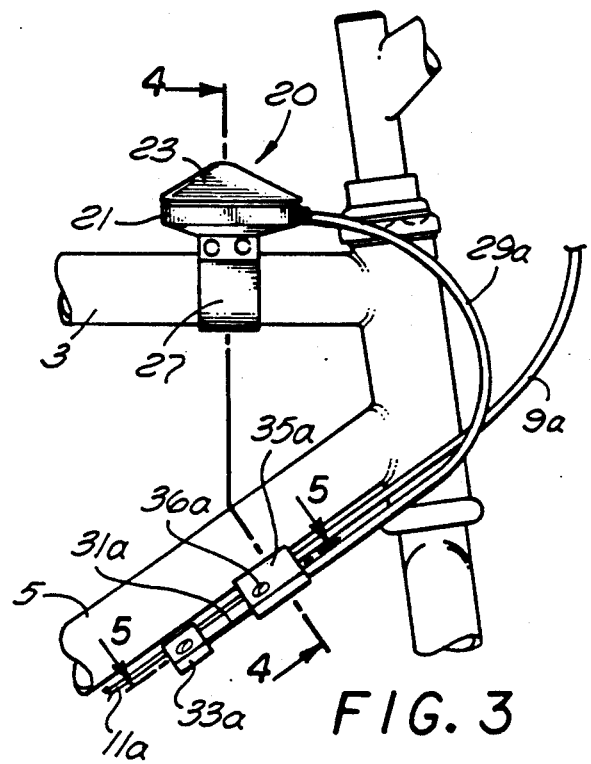
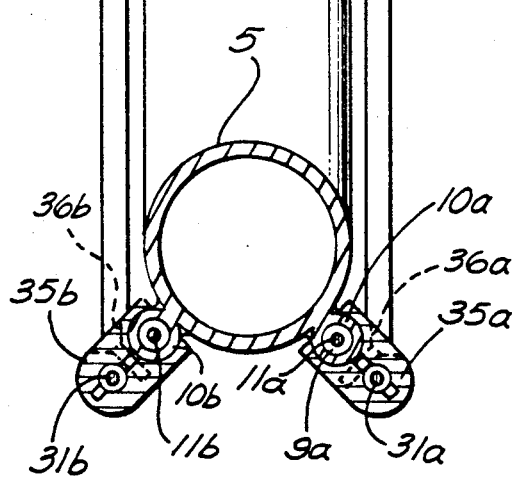
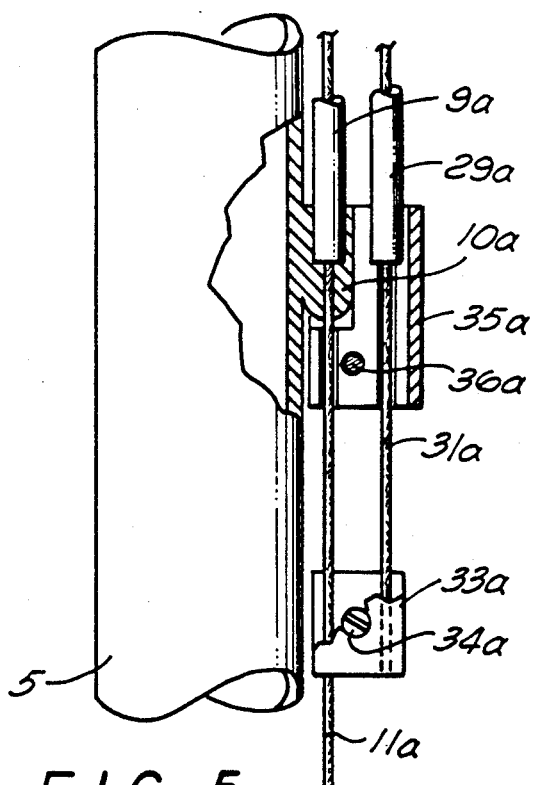
FIG. 3
FIG. 4
FIG. 5

BICYCLE GEAR DISPLAY

BACKGROUND OF THE INVENTION

1. Field of the Invention

The present invention is a display device, for use on a multi-speed (multi-gear) bicycle, which displays the currently selected bicycle gear.

2. Art Background

The derailleur equipped bicycle is by far the most common type of multi-speed bicycle available today. These comprise between 5 and 8 sprockets (also known as cogs, a cluster, or more generally as gears) mounted on a freehub at the rear wheel of the bicycle and between 1 and 3 chainrings attached to the bicycle crank. By varying the combinations of front chainring and rear sprocket that are connected by the bicycle chain, a wide range of gear ratios may be obtained. This is accomplished by the use of front and rear derailleurs respectively. A problem inherent in this system is the difficulty involved in determining what gear the bicycle is in at a given moment. To do this, the rider must observe the chainrings and sprockets. Positioned between the rider's legs, the front chainrings are fairly easy to see and, with the relatively small number of chainrings, it is often possible to remember which chainring the chain is engaging. The rear sprockets are by contrast rather difficult to see from a riding position. In trying to view the sprockets, a rider must take his eyes off the road and engage in a series of contortions while also interrupting his pedaling cadence. The dangers and inconveniences of this are readily apparent.

To solve this problem, a gear indicator is required which is located in a position that is easily viewable. In the prior art, a number of solutions have been proposed. These have generally involved either using a shift lever itself as the indicator, or connecting an indicator thereto. The first case is illustrated in U.S. Pat. No. 4,924,723 to Cristie. Cristie relates to a very simple stem mounted stick shifter. A lever is mounted substantially vertically and rotates about a horizontal shaft. The shift cable is mounted to a shorter arm of the lever which extends downward from the shaft. A longer upward extending arm is manually rotated to change gears. The arm protrudes through a slot in a housing. Numerals are inscribed on the housing along the slot. The numerals are positioned to line up with the arm when the bicycle is in the corresponding gear.

Examples of the second situation can be seen in U.S. Pat. Nos. 3,524,979 to Cohen and 4,586,396 to Nagano. As does Cristie, Cohen relates to a stick-type shifter. The stick is mounted on a horizontal shaft onto which a pulley is also mounted. The shift cable end is fixed relative to the pulley so that rotation of the shift will wrap or unwrap the cable from the pulley. The pulley is integrated with a driving gear which meshes with a smaller driven gear which in turn drives a rotary display via a flexible shaft (a spring bent 90 degrees).

Nagano relates to an improved arrangement for downtube mounted shift levers. Although shift levers have generally been disposed on opposite sides of the downtube, for ergonomic considerations Nagano places them atop the downtube and thus adjacent to one another. The patent's drawings further disclose a display member which is used to indicate which rear sprocket the chain engages. Although not a subject of the claims, nor described in detail in the specification, the display member appears to take the form of numerals inscribed on a ring disposed between two shift levers, along their axis of rotation. Adjacently attached to the rear derailleur lever is a gear of radius slightly larger than the ring. The outer circumference of the ring is toothed. Meshing with the ring teeth and lever gear is a small gear having two sections, one section necessarily of lesser radius than the other. By this mechanism, the rotation of the ring is amplified relative to that of the lever.

An electronic gear display is provided in U.S. Pat. No. 4,859,984 to Romano. Romano discloses the use of sensors attached to shift levers to determine the engaged gear. The sensors are connected to an electronic display. The sensors use a series of switch contacts disposed on the levers so that the contacts are selectively connected according to lever position.

All known prior art references for gear indicator devices require integration of the device with the shift lever (or knob, etc.) mechanism. All such devices require that either the indicator itself or gear position sensor be integrated with the shift lever. Due to the required integration, these devices are not suitable for aftermarket installation. Furthermore, as the shift levers on modern bicycles are located in a variety of places (downtube, handlebar, stem and handlebar-end mounted configurations predominating), the devices that require integration do not have the abilities to adapt to the various configuration. Finally, with the introduction of ratcheting or so called push-button shifters which are now prevalent on mountain bicycles (MTBs) use of the lever itself as an indicator is no longer feasible, as its position is unrelated to the engaged gear.

SUMMARY OF THE INVENTION

To solve the above-mentioned problems, the present invention provides a separate display which indicates which of the sprockets is engaged by the chain. Although, as noted above, the shift levers on modern bicycles are located in a variety of places, a common attribute shared by most systems is that the bare shifter cables pass along the bicycle downtube, the sloping tube between the front fork area (head tube) and the crank area (bottom bracket). In the present invention, it is the motion of the cable that is detected to provide the display information. Accordingly the movement of the cable which controls the derailleur simultaneously controls the display. A toothed rack and a meshing pinion gear can be used to convert the linear cable motion into rotational motion of a display.

BRIEF DESCRIPTION OF THE DRAWINGS

FIG. 3 is a side view of the dual-display, remote embodiment of the present invention as mounted on a bicycle top tube.

FIG. 4 is a cutaway view of the dual-display, remote embodiment of the present invention as viewed along the axes of the bicycle top tube and downtube.

FIG. 5 is a cutaway view of the downtube, showing the shift cable interfacing in the remote embodiment.

DETAILED DESCRIPTION OF THE PREFERRED EMBODIMENTS

Figure 1:
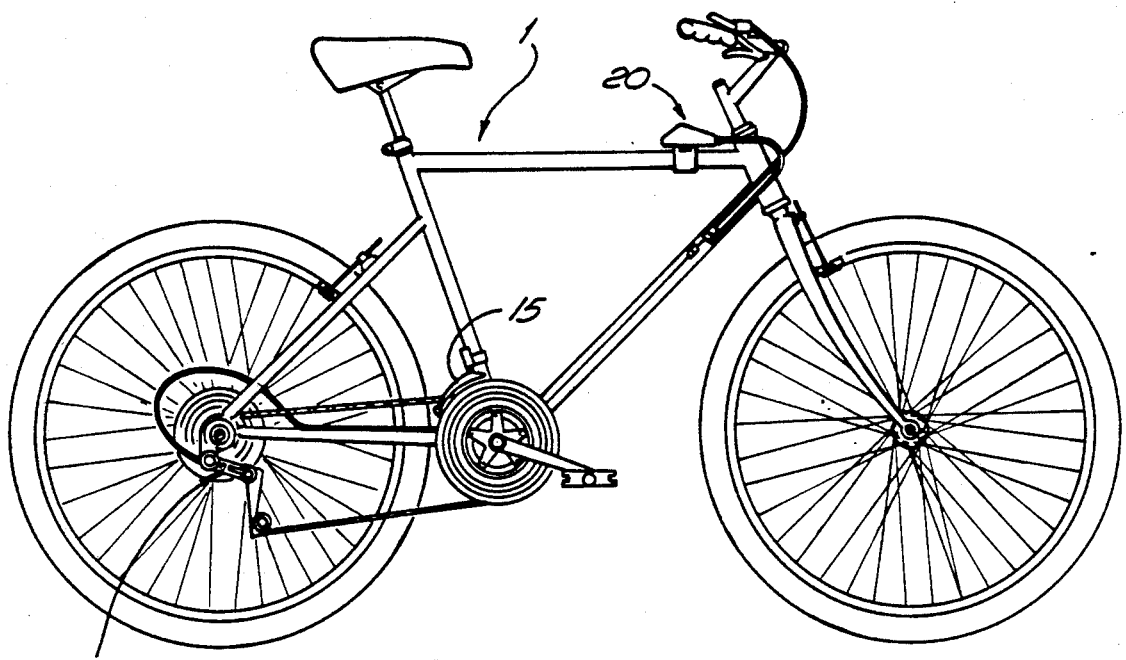
FIG. 1 is a side view of a bicycle bearing the dual-display, remote embodiment of the present invention.
Figure 2:
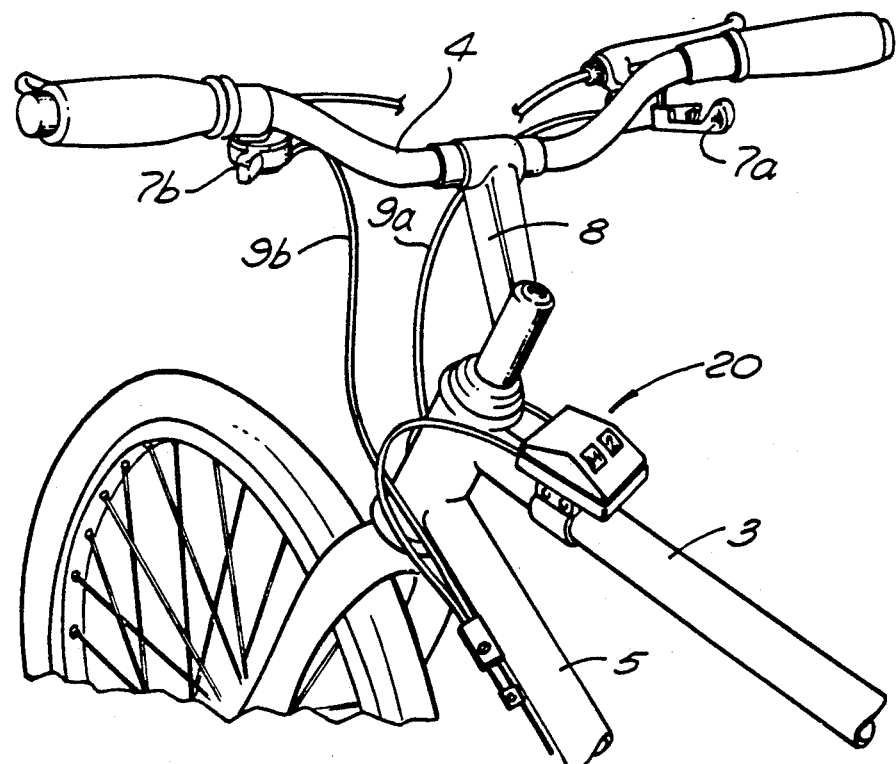
FIG. 2 is a perspective view of the front end of a bicycle bearing the dual-display, remote embodiment of the present invention.

An embodiment of the display device 20 for remote mounting also featuring displays for both front and rear derailleurs is depicted in FIGS. 1 through 9. Shifter cables 11a and 11b for controlling rear and front derailleurs 13 and 15 of bicycle 1 respectively, run adjacent to downtube 5. Slave cables 31a and b are respectively attached to the shift cables and are used to translate the motion of the shift cables to the remote location where the display is mounted. The slave cables are connected to actuator racks 37a and b respectively. The actuator racks drive pinion gears 51a and b which rotate the display members 55a and b.

Figure 6:
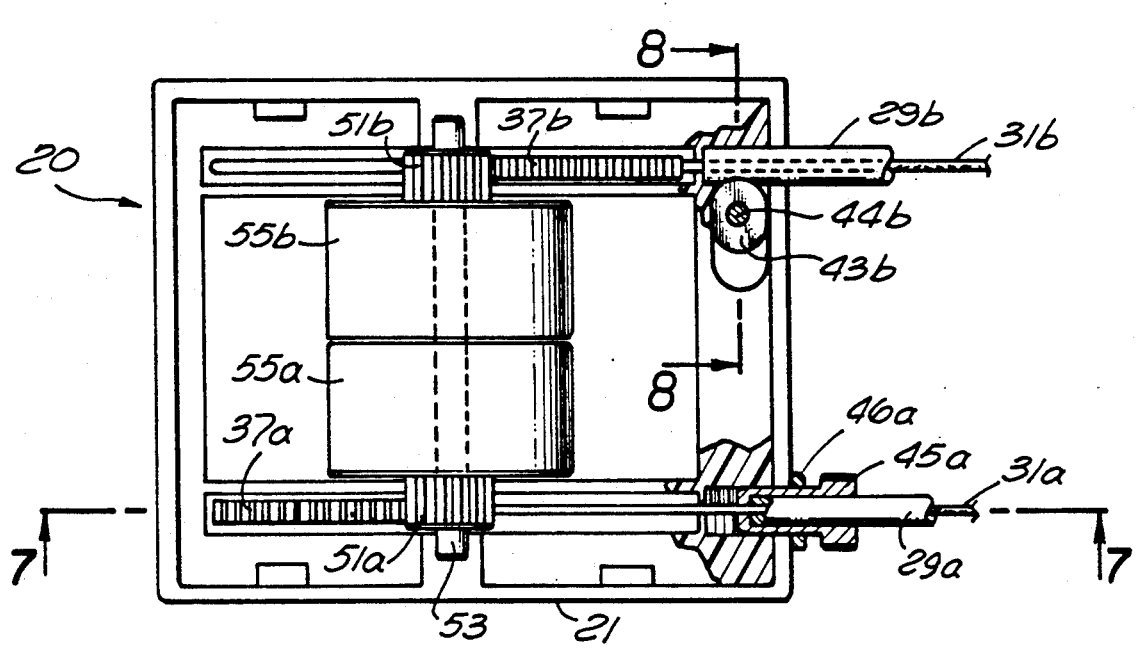
FIG. 6 is a top view of the remote embodiment of the present invention with the cover removed.
Figure 7:
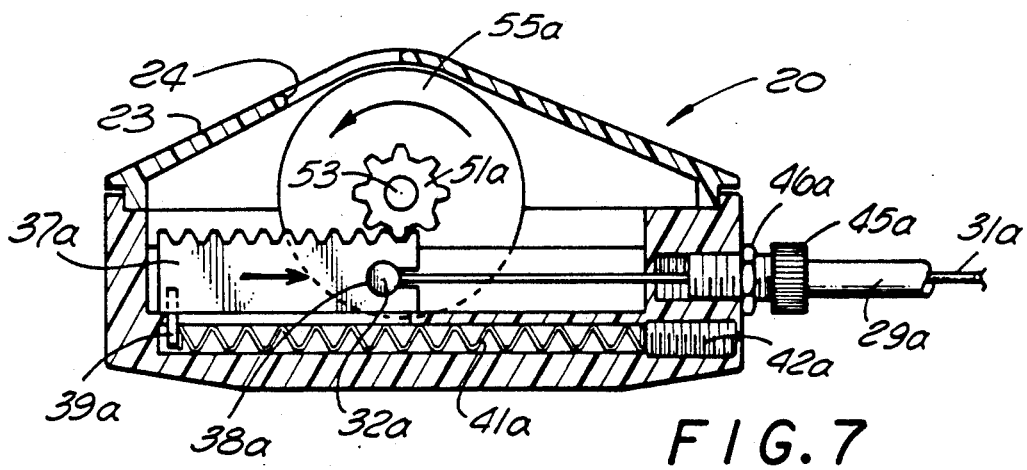
FIG. 7 is a side cutaway view of the dual-display, remote embodiment of the present invention.
Figure 8:
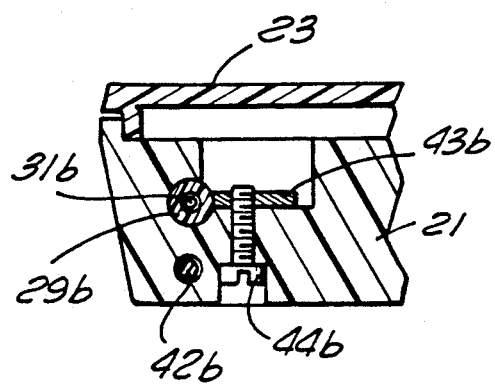
FIG. 8 is a front cutaway view of the dual-display, remote embodiment of the present invention.

The first ends of slave cables 31a and b are respectively attached to the shift cables 11a and b by clamps 33a and b with screws 34a and b. The first ends of slave cable casings 29a and b are held relative to the downtube using casing clamps 35a and b and screws 36a and b to clamp the casing ends to the shift cable bosses 10a and b respectively. The other ends of the casings are routed to the display housing 21. The casings may be attached to the display housing by a clamp such as 43b with screw 44b. Among other alternatives, the casing may be connected to the housing by an adjustment collar such as 45a with collar locking nut 46a. It will be understood that although FIG. 6 illustrates two alternative means for attaching the cable casings to the display housing, both of casings 29a and b may be secured in the same way.

The second ends of the slave cables are fitted with beads 32a and b to connect with slots 38a and b in actuator racks 37a and b respectively. Alternatively, racks 37a and b may be molded from a suitable plastic material such that the slave cables are formed integrally therewith. The racks are slidably fit in the display housing. Slave cable biasing springs 41a and b held with set screws 42a and b exert pressure between tabs 39a and b, on the racks 37a and b respectively, and the housing to keep the slave cables 31a and b in tension.

Positioned in mesh with the racks, 37a and b respectively, are pinion gears 51a and b riding on a shaft 53. Indicator members 55a and b are connected to the pinion gears 51a and b respectively. The indicator members have cylindrical faces 57a and b with gear markings 59a and b respectively. A cover 23 with display windows 24a and b fits atop the housing such that the markings may be seen through the windows. A clamping block 25 is attached to the bottom of the housing by screws 26. A tube clamp 27 and screws 28 attach the block to the bicycle top tube 3 to thus mount the housing. Although block 25 and clamp 27 are shown as separate pieces, these may be formed as a single integral molding.

Figure 9:
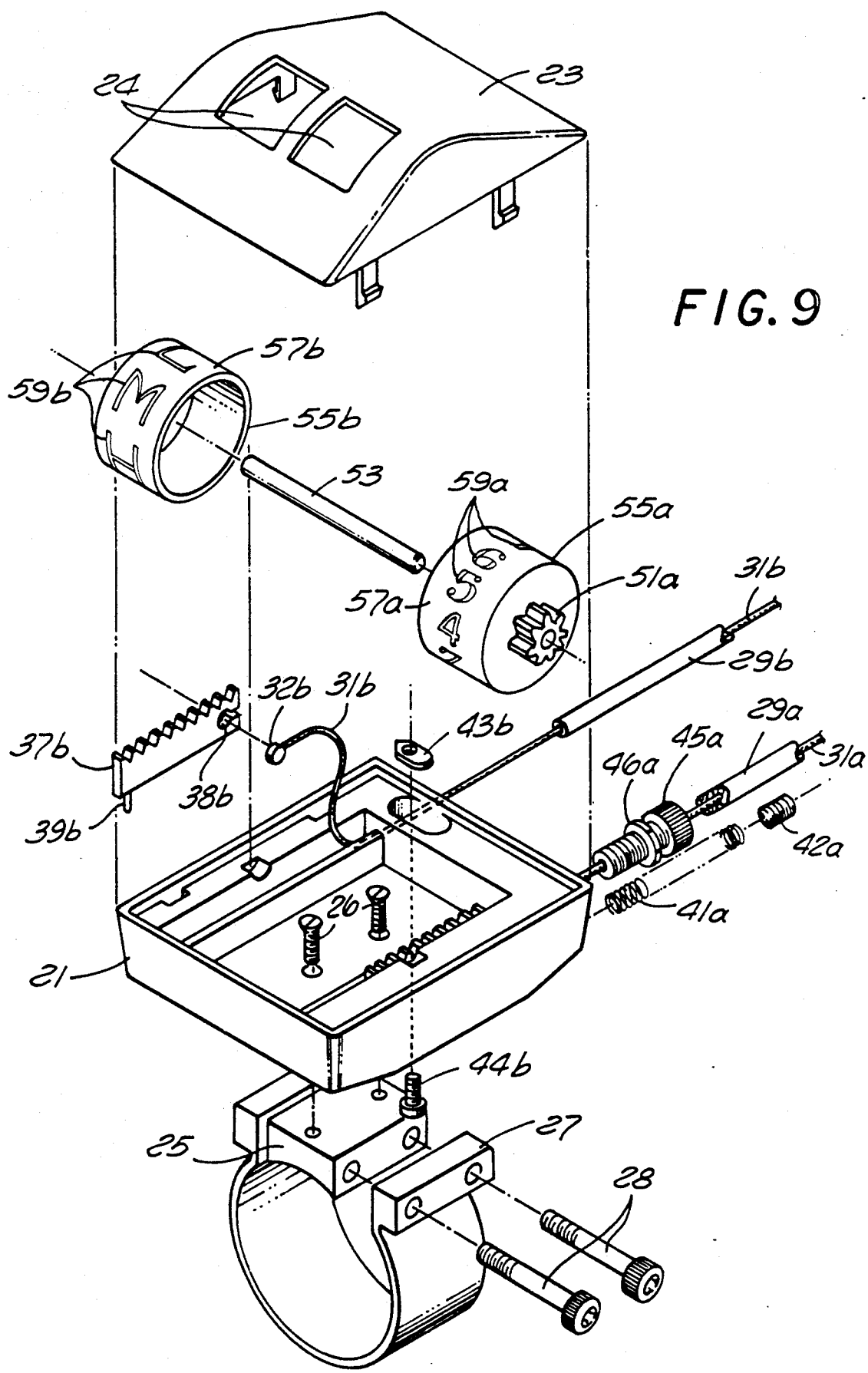
FIG. 9 is an exploded view of the dual-display, remote embodiment of the present invention.
Figure 10:
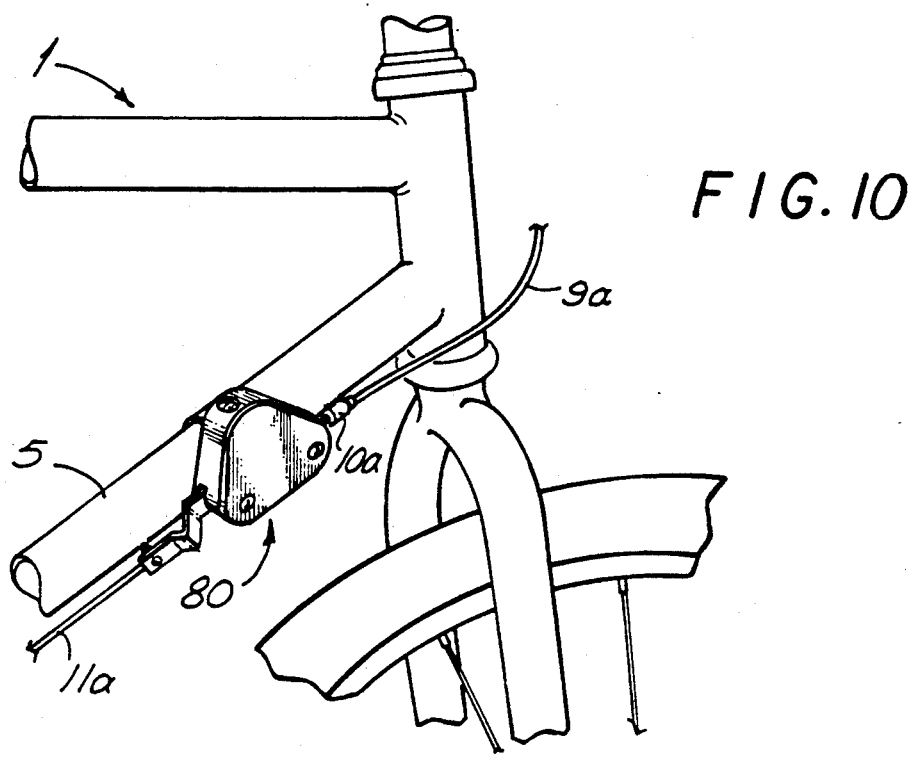
FIG. 10 is a perspective view of the downtube mounted embodiment of the present invention as mounted on a bicycle.
Figure 11:
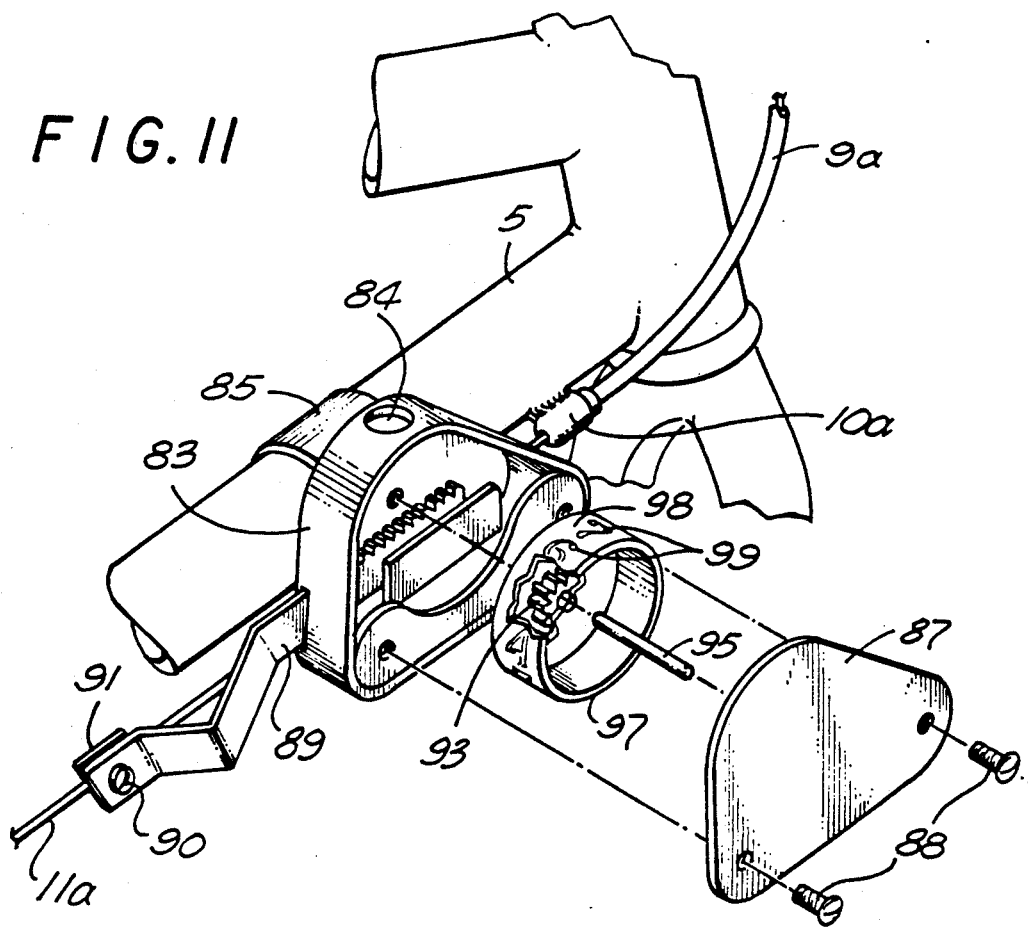
FIG. 11 is a partially exploded view of the downtube mounted embodiment of the present invention as mounted on a bicycle.

When the shift levers 7a and b are used to adjust the rear and front derailleurs via the shift cables 11a and b, the longitudinal motion of the shift cables is transmitted to the slave cables 31a and b respectively. The slave cables in turn move the racks 37a and b which causes the pinions to rotate so as to bring the display markings corresponding to the currently selected rear an gears into view. As shown in FIG. 9 the indicator members 55a and b are marked "7-6-5-4-3-2-1" (59a) and "L-M-H" (59b) which were chosen for a bicycle with seven rear cogs and three front chainrings. Alternative markings may be employed such as, for example, different colors to indicate the different gears. This is particularly applicable to the chainring indicator since this tends to be less precise. Proper alignment of the markings may be achieved by adjusting the position of the clamps 33a and b along the shift cables. If adjustment collars such as 45a are provided, they may also be used for this purpose.

Although the remote mounting embodiment is shown mounted on the top tube, it is obvious that it may also be mounted elsewhere on the bicycle frame, including on the handlebar 4 or stem 8 if desired.

An embodiment of the display device 80 for downtube mounting is depicted in FIGS. 10 through 14. Its function is similar to the remote embodiment, except the slave cables and related hardware are eliminated, in favor of attaching the rack directly to the shift cable.

Figure 12:
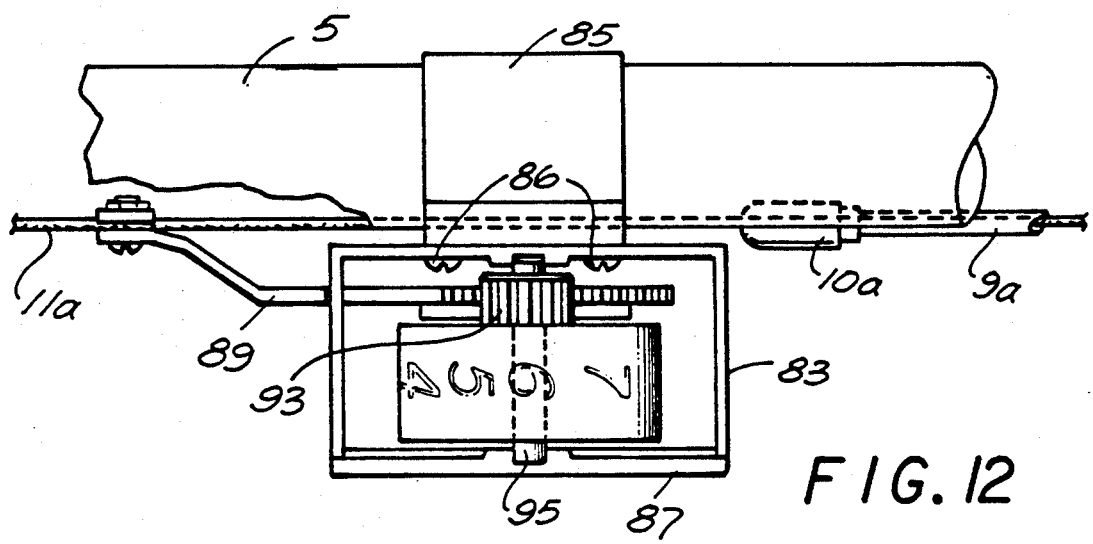
FIG. 12 is a side cutaway view of the downtube mounted embodiment of the present invention including a section of the downtube.
Figure 13:
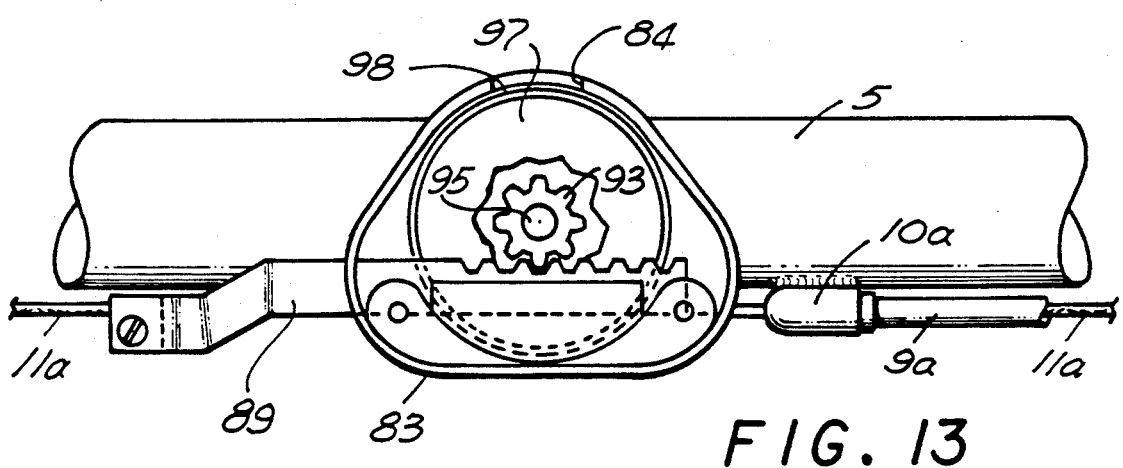
FIG. 13 is a top cutaway view of the downtube mounted embodiment of the present invention showing the connection with a bicycle shift cable.
Figure 14:
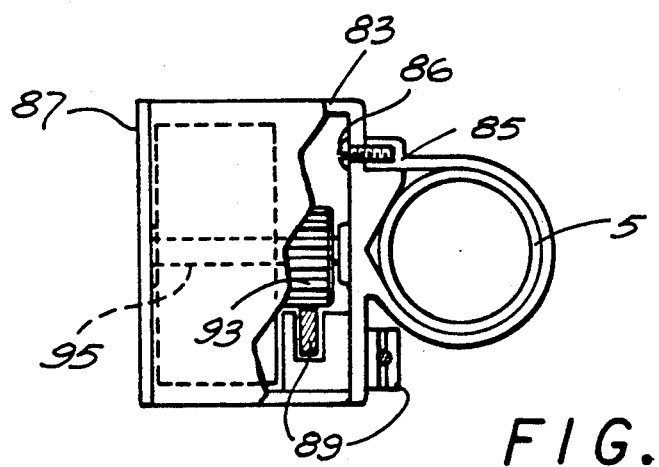
FIG. 14 is a cutaway view of the downtube mounted embodiment of the present invention as viewed along the downtube axis.

As is generally the case with derailleur equipped bicycles, a section of bare shift cable 11a runs adjacent to the bicycle downtube 5. An actuator rack 89 is attached to the cable by a clamp 91 and screw 90. The rack is oriented so as to slide within a display housing 83 which is attached to the downtube by integral tube clamp 85 and screws 86. Positioned in mesh with the rack is a pinion gear 93 riding on a shaft 95. An indicator member 97 is connected to the pinion. The indicator member has a cylindrical face 98 with gear markings 99 which are visible through a window 84 in the housing. A cover 87 is attached to the housing with screws 88. When the shift cable is moved, the rack causes the pinion to rotate so as to bring the marking corresponding to the current gear into view. As shown in FIG. 12, the display has markings "7-6-5-4-3-2-1" which were chosen for use on a bicycle with 7 rear cogs. Proper alignment of the markings may be achieved by adjusting the position of the rack along the shift cable.

The above embodiments are merely illustrative of displaying the selected gear(s) based upon the position of the shift cable(s). In addition to permutations such as a single display remote or dual display downtube models, the mechanism may be modified to replace the use of racks and pinions. Furthermore, the mechanical indicator members of the described embodiments may be replaced with a suitable electronic display, such as a liquid crystal device, and associated electronic circuitry providing display outputs responsive to the cable position. Various position sensing devices are well known. Also, the device may be modified to show a gear ratio as opposed to numbers or letters intended to denote the specific cogs and chainrings. This would be especially appropriate if the device was made in an electronic form, taking the input from the motion of the shift cables and displaying a number indicative of an overall gear ratio.

Although the above discussion is based on the common derailleur bicycle with standard frame configuration, it would be obvious to one of ordinary skill in the art that the present invention may be used wherever a similar physical situation is encountered. For instance, on a bicycle featuring a transmission housed in the rear hub, such as STURMEY ARCHER, which is still cable operated, the present invention would be quite useful. Additionally, on cycles of yet unknown configurations, the present invention may be used wherever there is a gear changing cable to access. Finally, non-gear and non-bicycle applications are possible if an analogous physical situation is present.

I claim:

1. A gear display accessory device for attachment to a multi-gear bicycle, said bicycle having cable-operated gear shifting means with a gear shift cable extending between a shift lever and a gear shifting mechanism, comprising:
    means for interfacing with the gear shift cable comprising clamping means said means for interfacing for clamping to an exposed portion of the gear shift cable between the shift lever and the gear shifting mechanism;
    display means for indicating a currently selected gear;
    means for coupling the display means to the cable interfacing means; and
    a housing.

2. The gear display device of claim 1, wherein
    a) the cable interfacing means includes a toothed rack attached to the gear shift cable and oriented substantially parallel thereto, and,
    b) the coupling means includes a pinion gear positioned in mesh with the rack and coupled to the housing for axial rotation, such that longitudinal motion of the gear shifting cable rotates the pinion.

3. The gear display device of claim 2, wherein said display means has an indicator member with indicia disposed thereon corresponding to respective gears.

4. The gear display device of claim 3, wherein the indicator member is substantially cylindrical and is coaxially attached to the pinion.

5. The gear display device of claim 1, wherein said bicycle includes a second cable-operated gear changing means and a second gear shift cable further including:
    second means for interfacing with the second gear shift cable;
    second display means for indicating a gear currently selected by the second gear changing means; and,
    means for coupling the second display means to the second interfacing means.

6. The gear display device of claim 1, wherein the cable interfacing means includes a slave cable having first and second ends, the first end being coupled to the gear shifting cable.

7. The gear display device of claim 6 wherein
    a) the cable interfacing means further includes a toothed rack coupled to the second end of the slave cable,
    b) the means for coupling the display and cable interface means includes a pinion gear positioned in mesh with the rack and coupled to the housing for axial rotation, such that longitudinal motion of the gear shifting cable rotates the pinion, and,
    c) the coupling means further includes a shaft carried by the housing, on which shaft the pinion rides.

8. The gear display device of claim 7 wherein the cable interface means further includes a slave cable casing enclosing a segment of the slave cable.

9. The gear display device of claim 8 wherein the slave cable casing has a first end coupled to the frame of the bicycle and a second end coupled to the housing.

10. The gear display device of claim 9, wherein said display means has an indicator member with indicia disposed thereon corresponding to a respective gears.

11. The gear display device of claim 10, wherein the indicator member is substantially cylindrical and is coaxially attached to the pinion.

12. A gear display device for a multi-gear bicycle, said bicycle having a frame and having first and second cable-operated gear shifting means with first and second gear shift cables routed along the frame, comprising:
    a housing including a clamp for mounting on the bicycle and a cover with at least one window;
    means for interfacing with the first and second gear shift cables including:
        first and second slave cables each having first and second ends, the first end of each cable being clamped to the respective first and second gear shift cables;
        first and second slave cable casings enclosing segments of the respective slave cables and having one end coupled to the bicycle frame and another end coupled to the housing;
        first and second toothed racks coupled to the second ends of the respective slave cables;
    display means for indicating respective gears currently selected by said first and second gear shifting means, including first and second indicator members, which indicator members include indicia corresponding to the respective gears of the first and second gear changing means; and
    means for coupling the display means to the cable interfacing means including first and second pinion gears coupled to the respective indicator members and positioned in mesh with the first and second racks respectively and coupled to the housing for axial rotation, such that longitudinal motion of the first and second gear shift cables rotates the respective pinion.

13. The gear display device of claim 3, wherein the housing has an aperture therethrough for exposing the indicator member.

14. The gear display device of claim 1 wherein the display means comprises an electronic display.

15. A gear display device for a multi-gear bicycle, said bicycle having cable-operated gear shifting means with a gear shift cable, comprising:
    a housing;
    means for interfacing with the gear shift cable, including a toothed rack attached to the gear shift cable and oriented substantially parallel thereto;
    display means for indicating a currently selected gear, including a pinion gear positioned in mesh with the rack and coupled to the housing for axial rotation, such that longitudinal motion of the gear shifting cable rotates the pinion; and
    means for coupling the display means to the cable interfacing means, including an indicator member with indicia disposed thereon corresponding to respective gears wherein the indicator member is substantially cylindrical and is coaxially attached to the pinion.

16. The gear display device of claim 15 wherein the housing has an aperture therethrough for exposing the indicator member.

17. The gear display device of claim 15 wherein the display means comprises an electronic display.

18. A gear display device for a multi-gear bicycle, said bicycle having first and second cable-operated gear shifting means with respective first and second gear shift cables, comprising:

a housing;

first means for interfacing with the first gear shift cable;

first display means for indicating a gear currently selected by the first gear shifting means;

means for coupling the first display means to the first cable interfacing means;

second means for interfacing with the second gear shift cable;

second display means for indicating a gear currently selected by the second gear shifting means; and means for coupling the second display means to the second interfacing means.

19. The gear display device of claim 18 wherein the housing has a pair of apertures therethrough for exposing the first and second display means.

20. The gear display device of claim 18 wherein at least one of the first and second display means comprises an electronic display.

* * * * *

UNITED STATES PATENT AND TRADEMARK OFFICE
CERTIFICATE OF CORRECTION

PATENT NO. : 5,178,033
DATED : January 12, 1993
INVENTOR(S) : August Kund

It is certified that error appears in the above-indentified patent and that said Letters Patent is hereby corrected as shown below:

Col. 5, line 24, after "means" delete "said means for interfacing" and insert after "clamping"

Col. 6, line 11, after "to" delete "a"

Signed and Sealed this

Twenty-second Day of March, 1994

Attest:

BRUCE LEHMAN

*Attesting Officer*     *Commissioner of Patents and Trademarks*